Sept. 17, 1929.  L. J. CUDAHY  1,728,594
HOIST BRAKE
Filed Jan. 27, 1928

INVENTOR
Lawrence J. Cudahy
BY Chappell & Earl
ATTORNEYS

Patented Sept. 17, 1929

1,728,594

UNITED STATES PATENT OFFICE

LAWRENCE J. CUDAHY, OF MUSKEGON, MICHIGAN, ASSIGNOR TO SHAW-CRANE-PUTNAM MACHINE CO. INC., OF MUSKEGON, MICHIGAN, A CORPORATION OF DELAWARE

HOIST BRAKE

Application filed January 27, 1928. Serial No. 249,860.

The main objects of this invention are to provide an improved brake for hoists and the like which is capable of sustaining heavy loads, is very positive in action and one which, though simple and compact in structure, is very durable.

A further object is to provide an improved brake for hoists and the like which requires little attention and renders practical the use of a pulverulent lubricating material.

Objects relating to details and economies of my invention will appear from the detailed description to follow. The invention is defined and pointed out in the claims.

A structure which is a preferred embodiment of my invention is illustrated in the accompanying drawing, forming a part of this application, in which.

In the drawing similar reference characters refer to similar parts throughout the several views.

Figures 1, 2, 3:
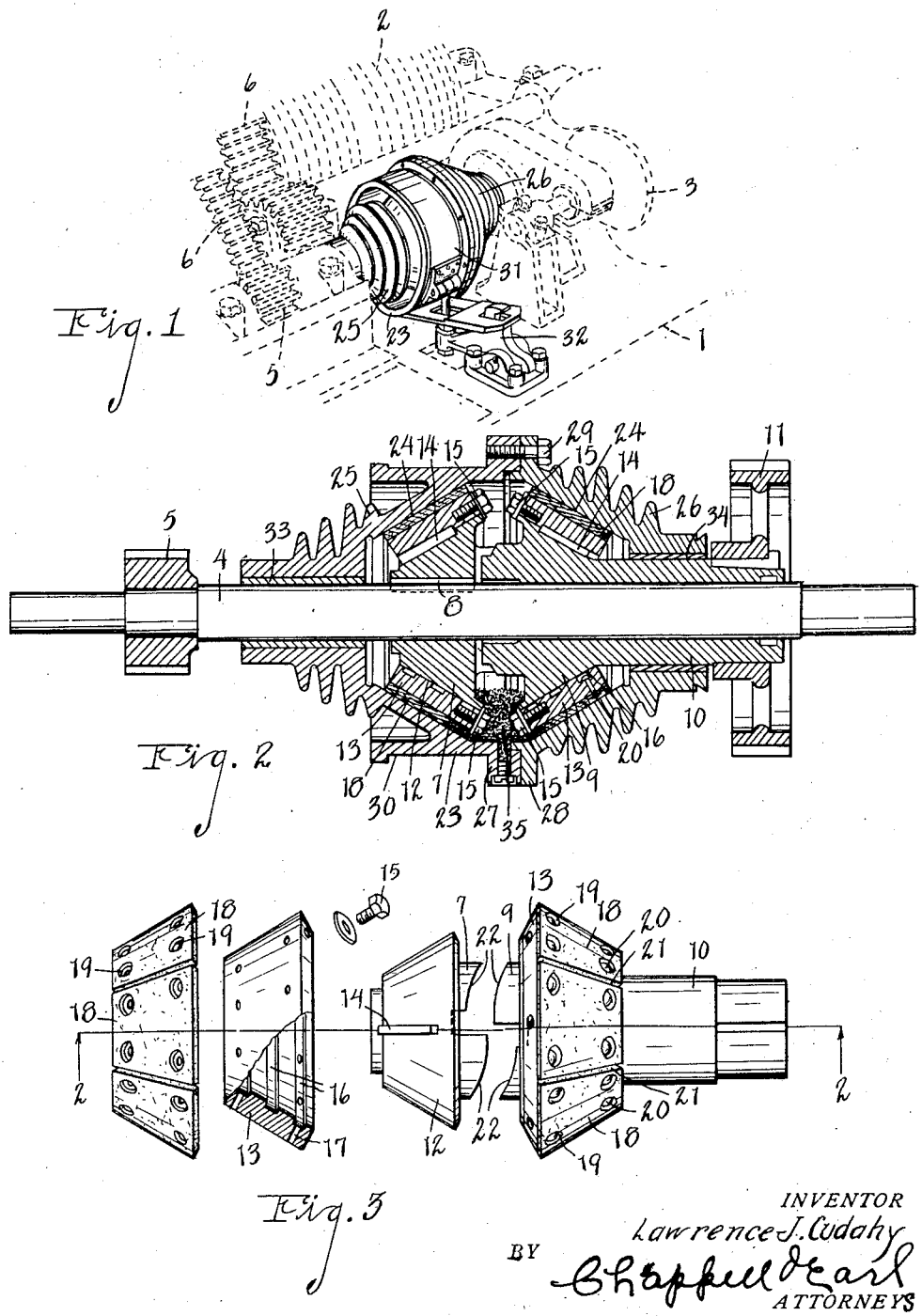
Fig. 1 is a perspective view of my improved brake, portions of a hoist being shown in operative relation thereto by dotted lines.
Fig. 2 is a central longitudinal section through my improved brake on a line corresponding to line 2—2 of Fig. 3, the shaft being shown in full lines.
Fig. 3 is a plan view of the driving and driven clutch members, the driven clutch member being disassembled.

Referring to the drawing, 1 represents the body of a hoist, 2 the winding winch or drum and 3 the motor. These parts are shown in order to illustrate a practical embodiment of my improvements.

My improved brake mechanism comprises a shaft 4 having a gear 5 secured thereto and meshing with one of the gears of a train of gears indicated at 6 connecting the gear 5 to the drum 2.

A driven clutch member designated generally by the numeral 7 is secured to the shaft to rotate therewith by means of the spline 8. The driving clutch member designated generally by the numeral 9 has a sleeve-like extension 10 rotatably mounted on the shaft 4 and provided with a driving gear 11 driven from the motor 3, the driving connections not being illustrated.

These clutch members comprise conical body portions 12 having conical facing supporting shells 13 secured thereto by means of the keys 14 and the clamping screws 15, the screws being threaded longitudinally into the shells and engaging the larger ends of the body members so that the shells are drawn upon the body members in clamping engagement therewith.

The shells are provided with internal grooves 16 preferably annularly disposed and having a plurality of radial rivet holes 17 opening to the grooves so that the heads of the facing securing rivets are within the grooves.

The facings consist of a plurality of segmental facing members 18 having countersunk rivet holes 19 therein, these facings being secured by means of the rivets 20 with their edges in spaced relation providing a facing having longitudinal grooves 21 therein.

The clutch members are arranged facing outwardly and provided with helical cams 22 coacting, when the clutch members are given a relative rotative movement, to force the clutch members outwardly.

The casing 23 is provided with a pair of internal conical drums 24 coacting with the clutch members, the casing being formed of sections 25 and 26 having meeting flanges 27 and 28 respectively secured together by means of the screws 29. The member 25 of the casing is provided with a brake drum 30 with which the brake band 31 coacts, the ends of this brake band being connected to the actuating lever 32. The details of this actuating means for the brake band form no part of my present invention.

The casing is provided with a bearing 33 at one end coacting with the shaft and with a bearing 34 in the other end coacting with the sleeve extension of the clutch member 9. The casing is adapted as a container for a pulverulent lubricating material such as graphite, indicated at 35.

The facings 18 are preferably of some material such as commonly used in brake linings. The pulverulent lubricating material prevents "freezing" of the clutch members to the coacting drums without serious impairment of the clutching action. Also the pulverulent lubricating material does not escape from the casing as is likely to be the case with fluid lubricant.

By providing the clutch members with facing supporting shells, the facings may be readily secured, the spacing of the facing segments permitting effective distribution of the pulverulent lubricating material.

In operation, in lifting a load, the drum 2 is driven through the clutch mechanism, the rotation of the drum member 9 bringing the cams 22 into action to force the drum members apart or outwardly into clutching engagement with the casing and the whole structure revolves as a unit.

In lowering the load, the casing brake is actuated or set so that the load is held under the friction between the clutch members and the casing. In my preferred embodiment, this is sufficient to hold the load so that the motor must actually drive the load down when lowering.

I have illustrated and described my improvements in an embodiment which I have found highly practical. I have not attempted to illustrate certain adaptations which I have contemplated as it is believed that this disclosure will enable those skilled in the art to embody or adapt my improvements as may be desired.

Having thus described my invention, what I claim as new and desire to secure by Letters Patent, is:

1. In a structure of the class described, the combination of a shaft, a driving conical clutch member having a sleeve-like extension rotatably mounted on said shaft, a driven conical clutch member splined to said shaft, said clutch members being disposed facing outwardly and provided with coacting axially disposed helical cams whereby the clutch members are actuated by relative rotative movement thereof, each of said clutch members comprising a conical body portion, conical facing shells embracing said body portions and keyed thereto, clamping screws disposed longitudinally of said shells to engage the larger ends of said body members whereby the shells are clamped thereon, said shells having internal annular grooves with radial rivet holes opening to said grooves, segmental facings riveted to said shells with their edges in spaced relation providing peripheral longitudinal grooves for said clutch members, and a casing provided with a pair of internal inwardly facing conical clutch drums coacting with said clutch members, said casing being rotatably mounted at one end on said shaft and at the other end on said sleeve of said driving clutch member.

2. In a structure of the class described, the combination of a shaft, a driving conical clutch member having a sleeve-like extension rotatably mounted on said shaft, a driven conical clutch member splined to said shaft, said clutch members being disposed facing outwardly and provided with coacting axially disposed helical cams whereby the clutch members are actuated by relative rotative movement thereof, and a casing provided with a pair of internal inwardly facing conical clutch drums coacting with said clutch members, said casing being rotatably mounted at one end on said shaft and at the other end on said sleeve of said driving clutch member.

3. In a structure of the class described, the combination of a shaft, a pair of outwardly facing conical clutch members, one of which is keyed to said shaft and the other rotatable thereon, said rotatably mounted clutch member being provided with driving means, said clutch members being provided with coacting cams acting to actuate said clutch members on relative rotative movement thereof, a casing provided with internal conical oppositely disposed inwardly facing clutch drums coacting with said clutch members, each of said cluch members being provided with friction facings consisting of a plurality of independently attached segments disposed with their edges in spaced relation, said casing being adapted as a container for a pulverulent lubricating material, and a brake means for said casing.

4. In a structure of the class described, the combination of a shaft, a pair of outwardly facing conical clutch members, one of which is keyed to said shaft and the other rotatable thereon, said rotatably mounted clutch member being provided with driving means, said clutch members being provided with coacting cams acting to actuate said clutch members on relative rotative movement thereof, a casing provided with internal conical oppositely disposed inwardly facing clutch drums coacting with said clutch members, each of said clutch members being provided with friction facings, and a brake means for said casing.

5. In a structure of the class described, the combination of the driving and driven outwardly facing conical clutch members provided with coacting cams acting to actuate said clutch members on relative rotative movement thereof, each of said clutch members comprising a conical body portion, conical facing shells embracing said body portions and keyed thereto, clamping screws disposed longitudinally of said shells to engage the larger ends of said body members whereby the shells are clamped thereon, said shells having internal annular grooves with radial rivet holes opening to said grooves, segmental facings riveted to said shells with their edges in spaced relation providing peripheral longitudinal grooves for said clutch members, a casing provided with a pair of internal inwardly facing conical clutch drums coacting with said clutch members, said casing being adapted as a container for a pulverulent lubricating material, and a brake means for said casing.

6. In a structure of the class described, the combination of driving and driven outwardly facing conical clutch members provided with coacting cams acting to actuate said clutch members on relative rotative movement thereof, each of said clutch members comprising a conical body portion, conical facing shells embracing said body portions and keyed thereto, clamping screws disposed longitudinally of said shells to engage the larger ends of said body members whereby the shells are clamped thereon, said shells having internal annular grooves with radial rivet holes opening to said grooves, facings riveted to said shells, a casing provided with a pair of internal inwardly facing conical clutch drums coacting with said clutch members, and a brake means for said casing.

7. In a structure of the class described, the combination of driving and driven outwardly facing conical clutch members provided with coacting cams acting to actuate said clutch members on relative rotative movement thereof, each of said clutch members comprising a conical body portion, conical facing shells embracing said body portions and secured thereto, segmental facings secured to said shells with their edges in spaced relation providing peripheral longitudinal grooves for said clutch members, a casing provided with a pair of internal inwardly facing conical clutch drums coacting with said clutch members, said casing being adapted as a container for a pulverulent lubricating material, and a brake means for said casing.

8. In a structure of the class described, the combination of driving and driven outwardly facing conical clutch members provided with coacting cams acting to actuate said clutch members on relative rotative movement thereof, each of said clutch members comprising a conical body portion, conical facing shells embracing said body portions and secured thereto, facings secured to said shells, a casing provided with a pair of internal inwardly facing conical clutch drums coacting with said clutch members, said casing being adapted as a container for a pulverulent lubricating material, and a brake means for said casing.

9. In a structure of the class described, the combination of driving and driven outwardly facing conical clutch members provided with coacting cams acting to actuate said clutch members on relative rotative movement thereof, each of said clutch members comprising a conical body portion, conical facing shells embracing said body portions and secured thereto, segmental facings secured to said shells with their edges in spaced relation providing peripheral longitudinal grooves for said clutch members, a casing provided with a pair of internal inwardly facing conical clutch drums coacting with said clutch members, and brake means for said casing.

10. In a structure of the class described, the combination of driving and driven outwardly facing conical clutch members provided with coacting cams acting to actuate said clutch members on relative rotative movement thereof, each of said clutch members comprising a conical body portion, conical facing shells embracing said body portions and secured thereto, facings secured to said shells, a casing provided with a pair of internal inwardly facing conical clutch drums coacting with said clutch members, and a brake means for said casing.

11. A clutch member comprising a conical body portion, a conical facing shell embracing said body portion and keyed thereto, clamping screws disposed longitudinally of said shell to engage the larger end of said body member whereby the shell is clamped thereon, said shell having internal grooves with rivet holes opening to said grooves, and segmental facings riveted to said shell with their edges in spaced relation.

12. A clutch member comprising a conical body portion, a conical facing shell embracing said body portion and having internal annular grooves with rivet holes opening to said grooves, and segmental facings riveted to said shell with their edges in spaced relation.

13. A clutch member comprising a conical body portion, a conical facing shell embracing said body portion and secured thereto, said shell having internal grooves with rivet holes opening to said grooves, and a facing riveted to said shell.

In witness whereof I have hereunto set my hand.

LAWRENCE J. CUDAHY.